United States Patent [19]
Lemon

[11] 3,797,170
[45] Mar. 19, 1974

[54] LOCKING ASSEMBLY FOR SLIDING PLUG DOORS

[75] Inventor: Lucien W. Lemon, Renton, Wash.
[73] Assignee: Paccar Inc., Bellevue, Wash.
[22] Filed: Oct. 12, 1972
[21] Appl. No.: 296,788

Related U.S. Application Data

[63] Continuation-in-part of Ser. No. 250,781, May 8, 1972, abandoned, which is a continuation-in-part of Ser. No. 181,730, Sept. 20, 1971, abandoned.

[52] U.S. Cl. .................................. 49/220, 74/424.8
[51] Int. Cl. ............................................. E05d 15/10
[58] Field of Search ....................... 49/220; 74/424.8

[56] References Cited
UNITED STATES PATENTS

| | | | |
|---|---|---|---|
| 3,494,074 | 2/1970 | Herr | 49/220 |
| 3,413,758 | 12/1968 | Palsson | 49/220 |
| 3,229,544 | 1/1966 | Haller | 74/424.8 |
| 2,769,214 | 11/1956 | Wright | 49/220 |

Primary Examiner—Kenneth Downey

[57] ABSTRACT

A locking assembly for sliding plug doors including a pair of vertical door supporting members mounted to lever arms allowing movement of the door in a direction perpendicular to the side of the car into and out of a tapered framework. The locking mechanism includes a pair of elongatable or extensible members which cause the lever arms to pivot about their axis, thus securing the door in the door opening. The members, through the use of a screw and ball nut, are capable of exerting sufficient outward force upon the closing lever mechanism to minimize the necessity for a secondary locking means, and considerably reduce the external force required by the operator to close and open the door. In the event that security demands a secondary locking means, vertically spaced locking bars may be provided. The secondary locking bars will be operated by the same screw and ball nut mechanism which operates the locking assembly, thus combining the two operations. Safety hangers are provided to prevent dislodgment of the door in the event the crank arms become disengaged or are broken.

2 Claims, 9 Drawing Figures

PATENTED MAR 19 1974 3,797,170

LOCKING ASSEMBLY FOR SLIDING PLUG DOORS

This application is a continuation-in-part of U.S. application Ser. No. 250,981, filed May 8, 1972, now abandoned. Application No. 250,981 was, in turn, a continuation-in-part of Application 181,730, filed Sept. 20, 1971, now abandoned.

BACKGROUND OF THE INVENTION

Two general types of railroad car doors are known in the prior art; namely, longitudinally slidable doors and plug type doors. This invention is concerned with a plug type door which is received in a tapered door opening in the side of the car with the door being movable in sequence both laterally and longitudinally of the side of the car. Gaskets are ordinarily provided around the periphery of the door and are adapted to be compressed against the frame of the door opening thereby to seal the opening. These gaskets are of a relatively rigid material which requires substantial force to compress the gasket. Further, the door and its mating frame are complementarily tapered such that they nest together when closed.

The presently available operating mechanism for such doors includes an operating lever secured to a pair of vertical rotatable pipes which serve as crank arm shafts mounting the doors on a railway car. The lever is controlled in its motion by a vertically disposed, horizontally rotatable handle means adapted to be manually operated. The handle is mechanically interconnected with the crank arm shaft to cause the shafts to rotate about their respective axis. The lever provides means by which sufficient mechanical advantage may be obtained to effect compression of the gaskets as the door closes into the opening. Various types of operating mechanisms have been developed with a view toward the convenient transmission of force to close the door during the closure cycle and to initiate and effect the opening of the door during the opening cycle.

In addition to the mechanism used for opening and closing the door, the prior art plug type door mechanisms have further included a separate locking means operated automatically at the end of the cycle of closing the door and at the beginning of the cycle of opening the door whereby the door is sufficiently secured in position by a plurality of longitudinally moved locking rods or bars. Additional locking means have been necessary since the use of the traditional gear type operating mechanism has not permitted sufficient force to be placed upon the vertical crank arm shaft to hold the door in position against the forces generated by a shift of cargo without the additional positive lock.

Whether the sliding plug type door is used with or without secondary locking means, the door is of a substantial size and weighs a great deal. When the door is open as well as when it is moving to or from the open condition the only means preventing outward movement of the upper portion of the door is the crank arm. In the event that one or both of the crank arms is cracked or broken or disengaged, the possibility of a door falling upon the individual operating the door is a danger worthy of concern. Means should be provided which provide additional safety against the falling of the door and into the upper portion of the vertical support thereby permitting pivotal movement but preventing relative lateral movement.

With the above noted remarks in mind it is an object of the present invention to provide an assembly for a sliding plug door wherein the means for moving the door laterally of the railroad car is capable of generating sufficient locking force to obviate the need for secondary locking means.

It is another object of the present invention to provide a locking assembly for a sliding plug door wherein the operating handle generates rotary motion which is then transferred to linear motion through the ball, nut and screw generating a much greater locking force than heretofore possible.

It is a further object of the present invention to provide a locking assembly for use with sliding plug doors wherein the assembly includes an integral shock absorbing mechanism thus preventing damage to the locking mechanism if the mechanism should be impacted when the door is in an open position.

It is yet another object of the present invention to provide a sliding plug door type locking mechanism which is axially compressible when in the unlocked position but becomes a rigid compressible element when the door is in its locked position.

A further object of the present invention is to provide means interrelated with the locking assembly for appropriately actuating locking bars or other secondary locking means if the operator feels that such is necessary for security purposes.

Yet another object of the present invention is to provide a safety device for use with a sliding, plug type door which does not affect the normal operation of the mechanism and yet prevents dislodgment of the door in the event of breakage or disengagement of the crank arm.

DETAILED DESCRIPTION OF THE DRAWINGS

Figure 1:
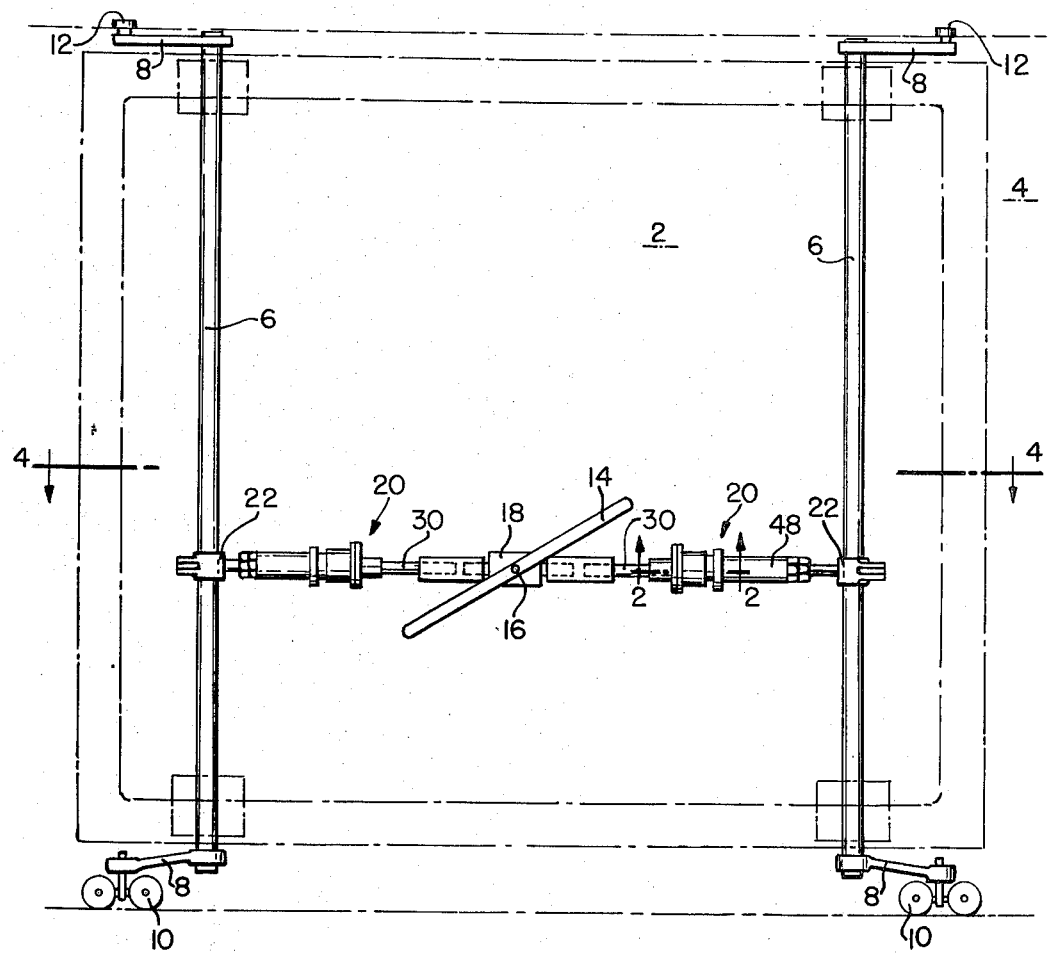
FIG. 1 is an elevational view of the inventive locking assembly shown in position upon a sliding plug type railroad car door.

As can be seen in FIG. 1 the plug door 2 is adapted to be wedgedly fitted to the side of insulated railroad cars generally designated as 4. The door 2 which must, for operatinal reasons, be moved both parallel to the side of the car 4 as well as laterally thereto is rigidly secured to a pair of vertical crank arm shafts 6 which are in turn secured to a lever 8 at either end. The levers 8 are in turn movably secured to the side of the railroad car by means of a combination of bogeys 10 which ride in tracks and guide wheels 12 assuring proper placement of the door relative to the side of the car. In operation, the door is moved parallel to the side of the railroad car by rolling upon the wheels 10 and moved laterally of the side of the car by actuation of the crank arm shaft 6 which causes the entire door to move in a pivotal fashion about the lever arms 8 thus moving the door laterally of the side of the railroad car.

In general the operation of the plug type door as shown is controlled by a manually operable 14 mounted upon a horizontal rotatably mounted shaft 16. The rotary motion of the shaft 16 is transmitted to a gear box 18 as described in greater detail hereinafter. The rotary motion of the shaft 16 is transferred by gear box 18 to a pair of crank arm operating shaft assemblies generally designated as 20, and described in greater detail hereinafter, which cause a crank arm 22 which is rigidly secured to the crank arm shaft 6 to move about the crank arm shaft. The rotary motion of the crank arm shaft moves the door 2 either inwardly or outwardly of the railroad car side as the levers 8 pivot about their fulcrum points.

Figure 2:
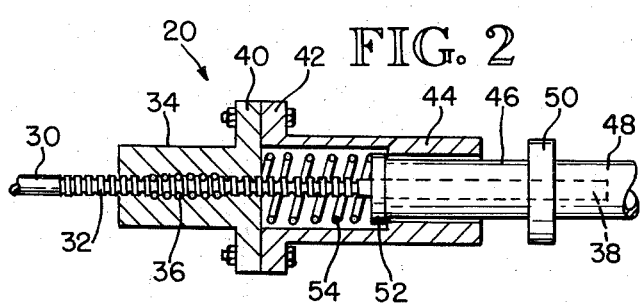
FIG. 2 is a section view taken along lines 2—2 of FIG. 1.

As can be seen in FIG. 2, the means for converting the rotary motion developed by handle 14 to the linear motion necessary to operate the crank arm 22 comprises a shaft 30 having a threaded end 32. The threaded end 32 of the shaft 30 extends into a complementary threaded nut 34 and the interaction between the threads 32 and the nut 34 are controlled by means of a plurality of circulating balls 37 in the fashion well known for a commercial ball nut. The operation of the ball nut is believed to be well known to those skilled in the art and details thereof will not be specifically described. The shaft 30 extends beyond the threaded portion 32 to a generally smooth portion 38 for reasons to be hereinafter described.

Ball nut 34 includes an outwardly extending flange 40 to which a flange 42 upon a sleeve 33 is bolted. Sleeve 44 has a smaller diameter hole 46 at its outboard end for reasons to be hereinafter described. Extending into the bore 46 is a hollow shaft 48 having an outwardly extending flange 50 spaced from the end and an outwardly spaced extending flange 52 at the end of said shaft.

Threaded shaft 30, sleeve 44 and hollow shaft 48 are assembled such that the shaft 30 extends through the ball nut 34 in through the internal portion of sleeve 44 and on into the center portion of shaft 48 thus being prevented from a great deal of angular movement relative thereto and yet sufficient to accommodate the movement caused by lever 22. Hollow shaft 48 is captured within sleeve 44 by virtue of the fact that the flanges 50 and 52, one of which is on either side of the openings 46, are both of greater diameter than the opening 46 to prevent it from movement therethrough. Mounted in a position surrounding shaft 30 between the flange 52 and the end of ball nut 34 is a compression spring 54 which allows relative linear movement of the shaft 48 in the open position with respect to shaft 30 without damage to the ball nut 34. It is to be understood that although a spring is shown as the preferred embodiment, any elastomeric or other resilient material could be used equally as well.

Referring again to FIG. 2, in operation the shaft 30 will be rotated causing the ball nut 34 to move axially of such shaft, thus when turned in one direction causing the hollow shaft 48 to be forced toward the ball nut by interaction of the flange 52 with the shaft 46, thus compressing the spring 54. In the reverse direction the sleeve 44 will move away from flange 56 and compression spring 54 will tend to move the hollow shaft 48 away from ball nut 34. When the door is in a locked position, i.e., the crank arm operating shaft mechanism is in its outermost position, it is anticipated that the flange 50 will abut the outer end of sleeve 44, thus presenting a rigid locking member of fixed length. When the door is in an open position, the crank arm operating shaft mechanism assembly, however, will be shown in FIG. 2, and thus if the outer end of the crank arm operating shaft were inadvertently impacted, the sleeve 48 would tend to compress spring 54, absorbing the shock without damaging the ball nut and ball screw combination.

Figure 3:
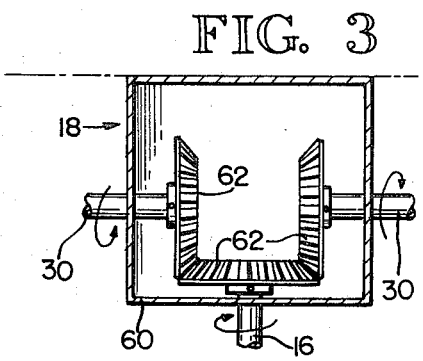
FIG. 3 is an enlarged view of a gearing mechanism for transferring the rotary motion of the handle to the rotary motion of the shafts.

FIG. 3 depicts one method of transmitting the rotary motion developed upon shaft 16 to rotary motion on shaft 30 for operation of the ball nuts. The gear box 18 will include a housing 60 and three bevel gears 62 in mesh whereby any rotary movement of shaft 16 will be immediately transmitted to the shafts 30 in a fashion well known in the art.

Figure 4:
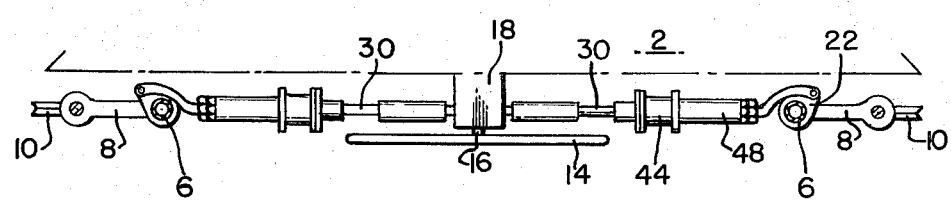
FIG. 4 is a plan view of the inventive locking mechanism showing the relative position of the elements when the door is in the locked position.

As seen in FIG. 4, the locking assembly for the sliing door is shown in a locked position and it can be seen that the crank arms 22 are moved outwardly from the center of the door, the lever arm 8 is essentially parallel to the side of the door and the flange 50 abuts the ends of sleeve 44.

The use of the ball nut combination enables an individual operating the handle 14 to generate sufficient force axially of the crank arm operating mechanism such that no further rigid locking is necessary to prevent accidental opening of the railroad car door. The railroad car may be securely locked in position and the mechanism required to assure such security is far less complex than heretofore known and yet includes means to absorb shock and prevent damage to the mechanism.

Figure 5:
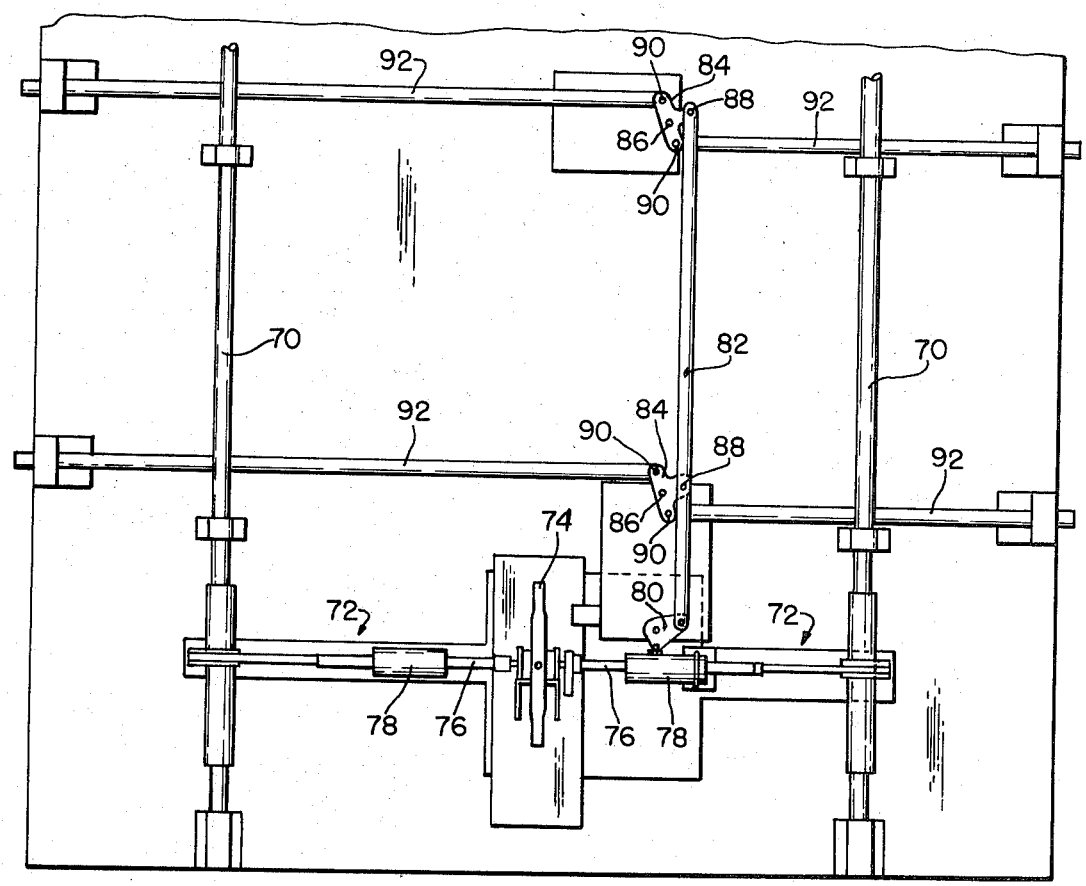
FIG. 5 is an elevational view of the inventive locking assembly in position upon a sliding plug door and further illustrating auxiliary locking bars and their operating mechanism.

Referring now to FIG. 5, the inventive locking assembly is shown in position upon a sliding plug type door similar to that described hereinabove and further including an optional locking bar mechanism. As seen in this figure, the mechanism includes a pair of relatively vertical door supporting bars or rods 70 having mounted at their upper and lower ends bogies and guide wheels as explained with respect to FIG. 1. Secured to the upstanding bars or rods 70 is a horizontal longitudinally movable actuating mechanism generally designated as 72 and which will be described in greater detail hereinafter.

Figure 6:
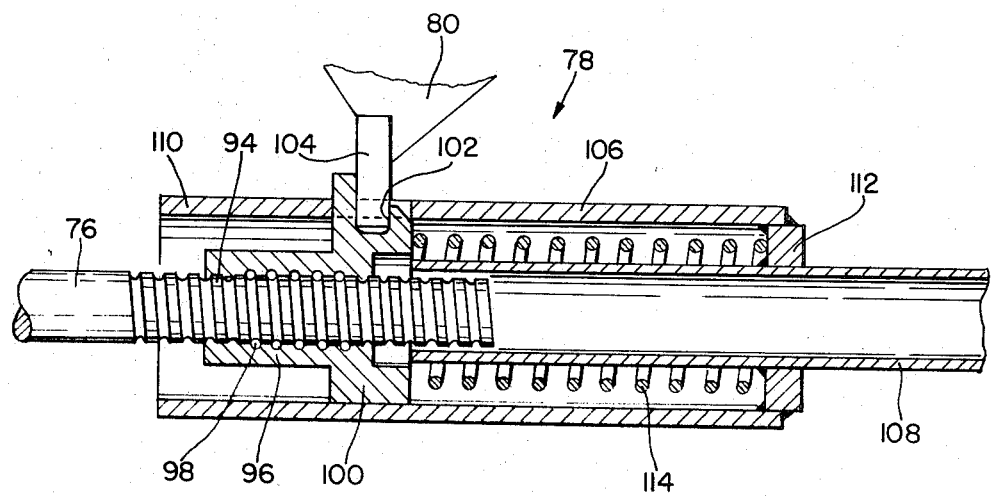
FIG. 6 is an enlarged sectional view taken through the locking assembly and locking bar operating mechanism.

Operatively connected to the longitudinally extendible locking mechanism is a handle 74 which may feed through a gear box much as described with respect to FIG. 3 providing rotary motion to rods 76 which, as will be explained with respect to FIG. 6, is transmitted into linear motion by means of ball nut assembly 78.

Mounted to the car door for pivotal movement therewith is a generally triangularly shaped lever or ball crank 80 which has one end secured to the ball nut assembly 78 for movement therewith and has at its opposite end a vertically extending and movable operating bar 82. Bar 82 has secured thereto a pair of T-shaped lever members or bell cranks 84 which are pivotally secured to the door at point 86. The bell cranks 84 are pivotally secured to the operating bar 82 at 88 and pivotally secured to locking bars or rods at each end of the T 90. Mounted for horizontal movement, which is caused by the T-shaped lever means or bell cranks 84 are locking bars 92, which, when in locking position, extend beyond the edges of the door and extend into the framework, thereby securing the door in position.

For proper operation the locking bars 92 must extend outwardly when the door is finally located in its plug position and likewise must retract before the door is attempted to be removed from its plug position. The mechanism, which allows the timed operation for the locking bars 92 as well as providing sufficient longitudinal movement to the locking bars to assure a secure interconnection, is shown in greater detail in FIG. 6. Rotatable bar 76 has at its outer end a threaded portion 94 which cooperates with a ball nut 96, the interconnection between the threaded portion 94 and the ball nut 96 being provided by captured balls 98. Ball nut 96 has an outwardly extending flange 100 which has a groove 102 in its upper portion to receive the downwardly depending dog 104 which is secured to the triangular shaped lever or bell crank 80. Surrounding the ball nut assembly is a casing 106 which is of a rectangular cross section to assure that the complementarily shaped flange 100 of ball nut 96 remains with its notch portion 102 upwardly to prevent disengagement of the dog 104. The sleeve or surrounding element 106 has an upwardly facing groove 110 which allows lateral movement of the flange 100 and has a closed end portion 112 which serves as a bearing point for a spring 114. Spring 114 is mounted between the flange 100 and the base portion 112 continually urging the end portion 112 and the attached rod 108 to the right such that the rod may absorb shock without damage to the ball nut. As described hereinabove, when the locking mechanism is secured, rod 108 will abut flange 100.

Figure 7:
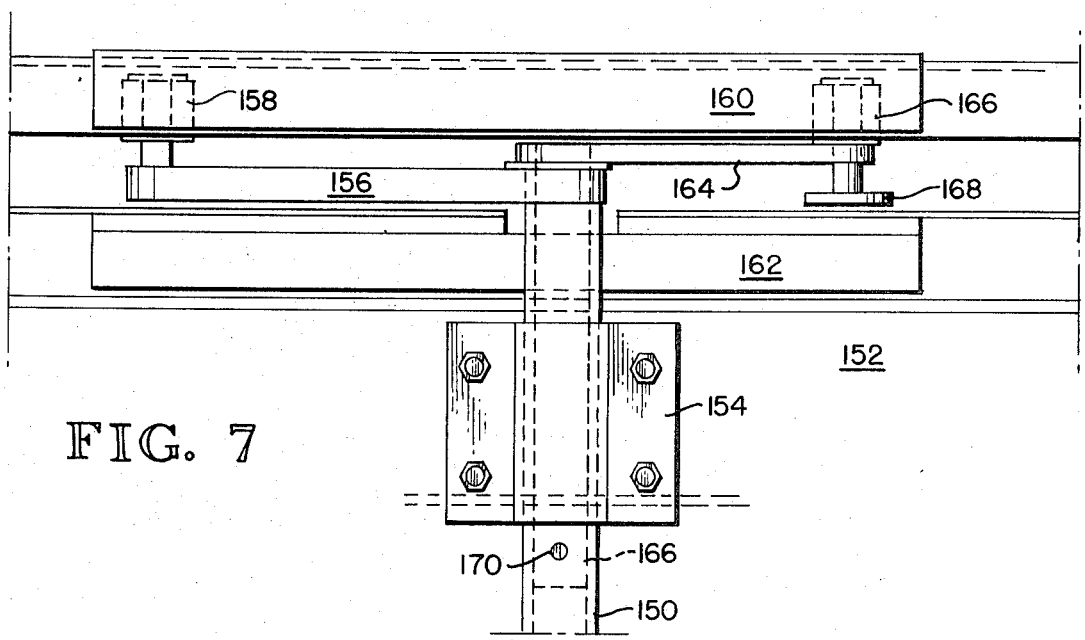
FIG. 7 is an enlarged view of the upper crank arm and the associated safety hanger.
Figure 8:
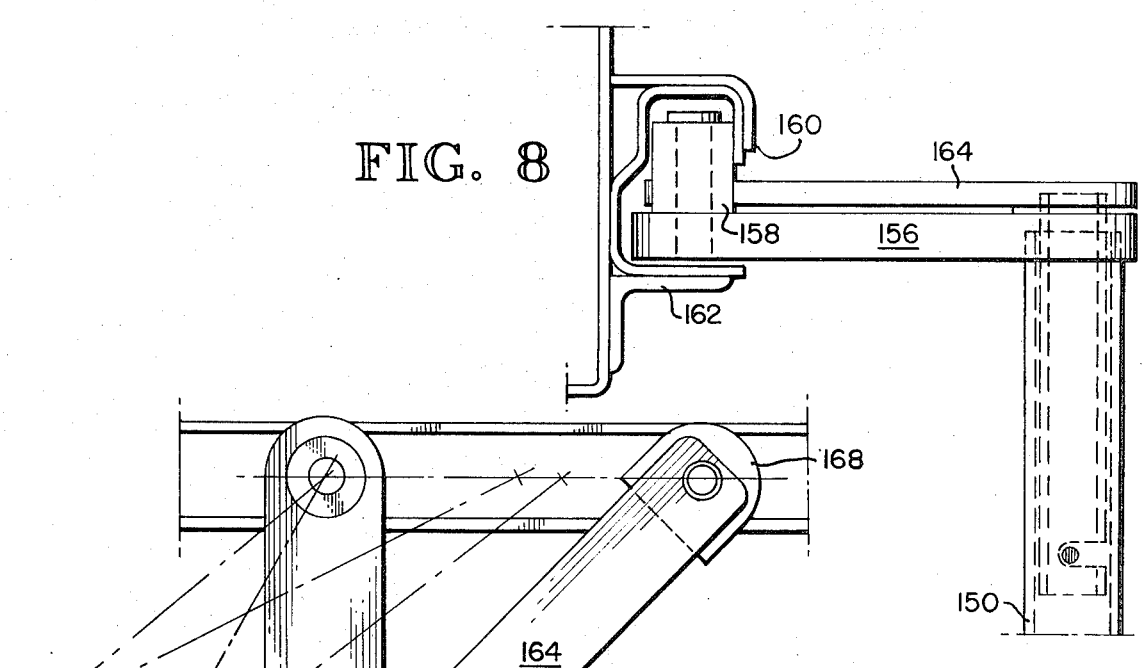
FIG. 8 is a side elevational view of the crank arm and safety hanger of FIG. 7.
Figure 9:
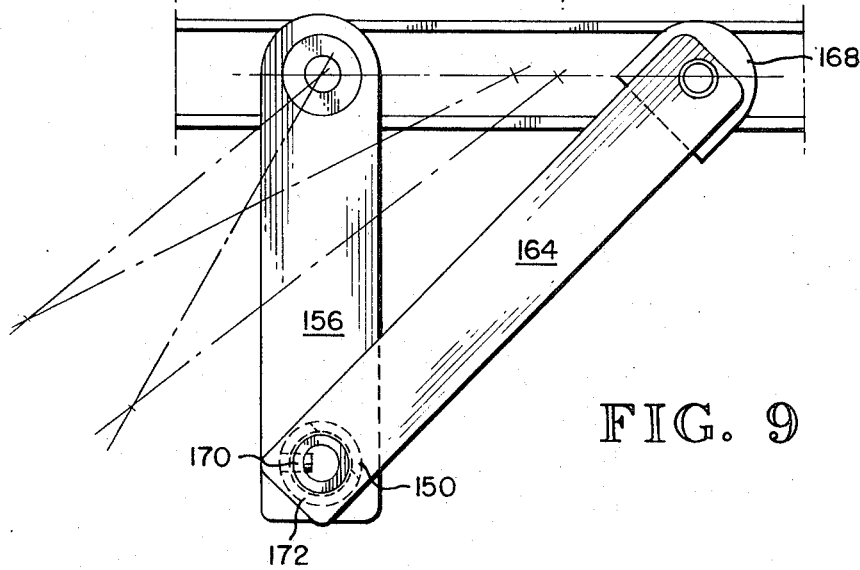
FIG. 9 is a plan view of the crank arm and safety hanger of FIG. 7.

Referring now to FIGS. 7–9 the novel means for preventing an accidental dislodgement of the door without interference with normal operation can be seen. The upper portion of a hollow crank arm shaft 150 is secured to the upper portion of plug door 152 by means of a loop strap 154 which is secured to the door and permits rotation of crank arm shaft 150.

Secured to the upper end of crank armshaft 150 is a crank arm 156 which has, as explained hereinabove, at its inboard end a roller 158 which is captured within an approximately C-shaped track 160 which is supported by an angle bracket 162. Since the crank arm and its function are well known in the art, further explanation will not here be given.

The auxiliary safety arm which will provide the strength necessary to retain the door in an upright position in the event of a breakage or disengagement of the crank arm 156 comprises a crank arm 164. The main body of the crank arm extends between a roller 166 mounted within the track 160 and a downwardly depending hollow shaft 166 which extends into the top of hollow crank armshaft 150. The shaft upon which roller 166 is mounted extends downwardly through crank arm 164 and terminates in a flange 168 which serves to retain the roller within the track at all times. The flange 168 will contact the bottom portion of track 160 preventing dislodgement thereof.

A pin 170 is mounted within shaft 166 and is secured in position within a slot 172 and crank armshaft 150 thus preventing the possibility of the shaft 166 moving vertically relative to shaft 150 allowing the door to fall.

As can readily be seen, the addition of the additional crank armshaft 164 prevents the possibility of the door falling from its position in the event of an accidental fracture, weakening or disengagement of the main crank armshaft. As seen in FIG. 9, the relative movement of the two arms allows complete utility of the door and the door hardware without interference by the safety arm and thus accomplishes the fact that the operator need do no more than what is already needed to do to operate the mechanism. Thus, without further interference the door is provided with the additional safety factor necessary to prevent the falling of the door.

Thus, it can be seen that the present mechanism may be used for locking plug type sliding car doors with or without secondary locking means.

The embodiments of the invention in which a particular property or privilege is claimed are defined as follows:

1. A locking assembly for a sliding plug type door for use upon railroad cars or the like comprising:
   support means for the door including a pair of vertical elements secured to the exterior of the door and pivotally secured to lever arms of both the top and bottom which are pivotally mounted to track-mounted carriages movable along the side of the car,
   first locking means including a pair of generally horizontal opposed elongated longitudinally movable elements secured to the door for movement therewith and secured to the vertical elements such that longitudinal movement of the horizontal elements rotates the vertical elements about a vertical axis selectively moving the door from a closed, locked position to an open position whereat it may be moved longitudinally of the car exposing the door opening,
   handle means mounted upon the exterior of the door mounted to a first shaft extending therethrough and interconnected with means transmitting rotary motion generated by the handle means to rotary motion along a second shaft approximately parallel to the door and interior thereof,
   ball nut means mounted to the second shaft means to multiply the force and translate the rotary motion to the horizontal elements at the first locking means whereby substantial locking force is generated with a much smaller force applied to the handle means, and
   shock absorbing means integral with the ball nut means whereby any jarring motion impacted to the first locking mechanism is absorbed at the ball nut thus preventing damage to the mechanism.

2. A locking assembly as in claim 1 and further including lever means pivotally mounted to the interior of the car door and keyed to an axially movable portion of the ball nut means, said lever means actuating second locking means upon movement of the first locking means.

* * * * *